United States Patent
Stockhausen et al.

(10) Patent No.: US 6,606,982 B1
(45) Date of Patent: Aug. 19, 2003

(54) CRANKCASE VENTILATION SYSTEM FOR A HYDROGEN FUELED ENGINE

(75) Inventors: William F. Stockhausen, Northville, MI (US); Robert Jay Natkin, Canton, MI (US); Lowell Reams, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,379

(22) Filed: Apr. 17, 2002

(51) Int. Cl.$^7$ .............................................. F02M 25/06
(52) U.S. Cl. ................................................... 123/572
(58) Field of Search ........................ 123/572, 573, 123/574, 41.86

(56) References Cited

U.S. PATENT DOCUMENTS

| | | | | |
|---|---|---|---|---|
| 3,589,347 A | * | 6/1971 | Sawada | 123/572 |
| 4,136,650 A | * | 1/1979 | Manookian, Jr. | 123/572 |
| 4,515,137 A | * | 5/1985 | Manolis | 123/572 |
| 5,586,996 A | * | 12/1996 | Manookian, Jr. | 123/573 |
| 6,148,807 A | * | 11/2000 | Hazen | 123/572 |
| 6,412,478 B1 | * | 7/2002 | Ruehlow et al. | 123/572 |
| 6,422,224 B1 | * | 7/2002 | Walker, Jr. | 123/572 |

* cited by examiner

*Primary Examiner*—Marguerite McMahon
(74) *Attorney, Agent, or Firm*—Allan J. Lippa

(57) ABSTRACT

A crankcase ventilation system for an internal combustion engine includes a first valve for controlling air flow into the engine's crankcase, a second valve for controlling air flow out of the crankcase, and a separator for receiving air flowing from the second valve and for removing oil entrained in the air. The first and second valves may be spring-operated valves, such as reed valves.

5 Claims, 2 Drawing Sheets

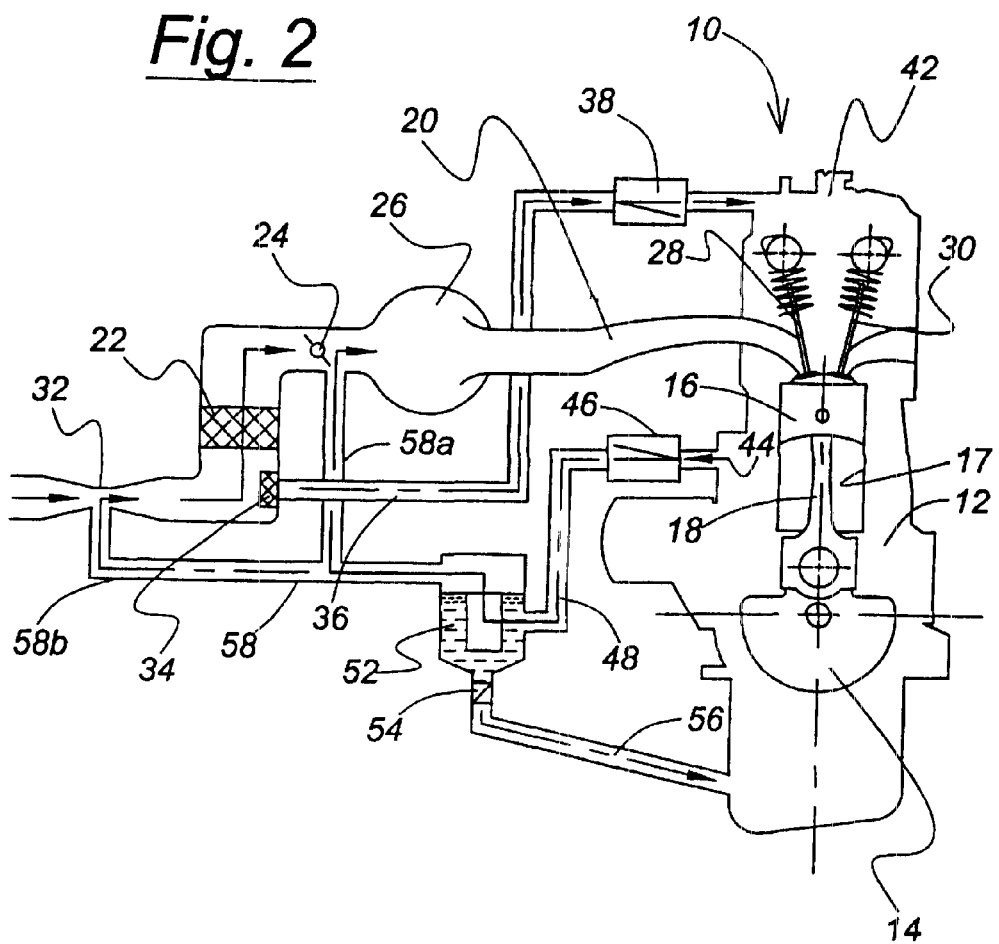

CRANKCASE VENTILATION SYSTEM FOR A HYDROGEN FUELED ENGINE

BACKGROUND OF INVENTION

1. Field of the Invention

The present invention relates to a system providing fresh air to the crankcase of an automotive type internal combustion engine suitable for operation on hydrogen fuel, regardless of whether hydrogen is actually employed in the engine.

2. Background Invention

Providing positive crankcase ventilation (PCV) for a hydrogen fueled engine is challenging to engine designers inasmuch as in the vent that oil mist is recirculated into the engine's intake system, pre-ignition may occur. Because the most efficient system of operating a hydrogen-fueled engine without throttling, the task of controlling PCV flow is made more difficult due to the elimination of the pressure differential within the manifold, which usually results from the use of a throttle. The inventors of the present invention have determined that using one or more reed valves in combination with an intake venturi in certain cases, and a coalescing oil separator may be used to build a system which allows appropriate crankcase ventilation without concomitant introduction of lubricating oil into the engine cylinders.

It is noted above that the most efficient method of operating a hydrogen fueled internal combustion engine is without a throttle. Such engines may be operated at extremely lean air/fuel ratio conditions. A hydrogen-fueled engine will produce carbon-based emissions (HC, CO2) only as a result of the consumption of lubricating oil. As a result, oxidizing catalytic aftertreatment is not usually required with hydrogen fuel, provided oil consumption can be controlled. Unfortunately, hydrogen fueled engines may be subject to pre-ignition as a result of hot oil mist, oil residue or oil ash remaining in the combustion chamber from previous combustion cycles. This material may cause the fresh charge to auto-ignite before the normal spark ignition event takes place. And, hydrogen is especially prone to pre-ignition due its low ignition energy requirement.

When a hydrogen-fueled engine is operating in an unthrottled mode, almost no differential pressure exists between the intake manifold and the crankcase because the blow-by gas is to flow from the crankcase into the intake manifold so as to be consumed by the engine in a normal manner. Diesel engines have this characteristic but are not known to employ one-way reed valves to establish pressure differential.

In order to provide PCV flow, a combination of one or more reed valves, and. possibly an intake venturi, are incorporated, as shown in the figures. The reed valves utilize the dynamic pressure pulses there produced I the crankcase of all typical reciprocating internal combustion engines. These dynamic pressure pulses result from the non-harmonic piston motion that exists because the piston speed is faster in the upper half of the stroke than in the bottom half. As a result, even though an equal number of pistons are simultaneously ascending in their cylinders as are descending, a pressure wave is generated due to unequal piston velocity. The incorporation of reed valves at the crankcase outlet, or both the inlet or outlet, assures positive PCV flow. A high efficiency oil separator of a coalescing type is necessary to remove a maximum amount of oil mist particles even down to the micron size. The coalescing filter in turn collects liquid oil from the crankcase vapors back to the engine crankcase via a drain line with a check valve in the drain line, which prevents pulling crankcase oil out of the oil pan when the coalescing element becomes plugged.

SUMMARY OF INVENTION

A crankcase ventilation system for internal combustion engine includes a first valve for controlling air flow into the engine's crankcase, a second valve for controlling air flow out of the engine's crankcase, and a separator for receiving air flowing from the second valve and for removing oil entrained in the flowing air. A crankcase ventilation system according to claim 1 further includes a drain line for returning separated oil from the separator to the crankcase. A return line conducts air from the separator to an induction system associated with the engine. The first and second valves, which preferably comprise fast-acting valves such as reed valves, operate-so as to open and close at a frequency which approximates the frequency of air pressure waves occurring within the crankcase.

According to another aspect of the present invention, the air flow through the first described valve originates upstream of the flow restriction in the induction system, with a return line conducting air from the separator to a portion of the induction system which is downstream from said flow restriction in said induction system. Flow restriction may comprise a throttle.

According to yet another aspect of the present invention, the air flow through the first valve may originate upstream of a flow restriction in the induction system, with the return line conducting air from the separator to a first portion of the induction system which is downstream from the flow restriction, as well as to a second portion of the induction system which is upstream from the flow restriction. The upstream portion may comprise a venturi through which air is being inducted into the engine.

It is an advantage of the present invention that a crankcase ventilation system according to this invention allows the introduction of oil-free air to the induction system of an engine.

Other objects, features and advantages of.the present invention will become apparent to the reader of this specification.

BRIEF DESCRIPTION OF DRAWINGS

FIG. 2 is similar to FIG. 1 showing a variation of an induction system according to the present invention.

DETAILED DESCRIPTION

Figure 1:
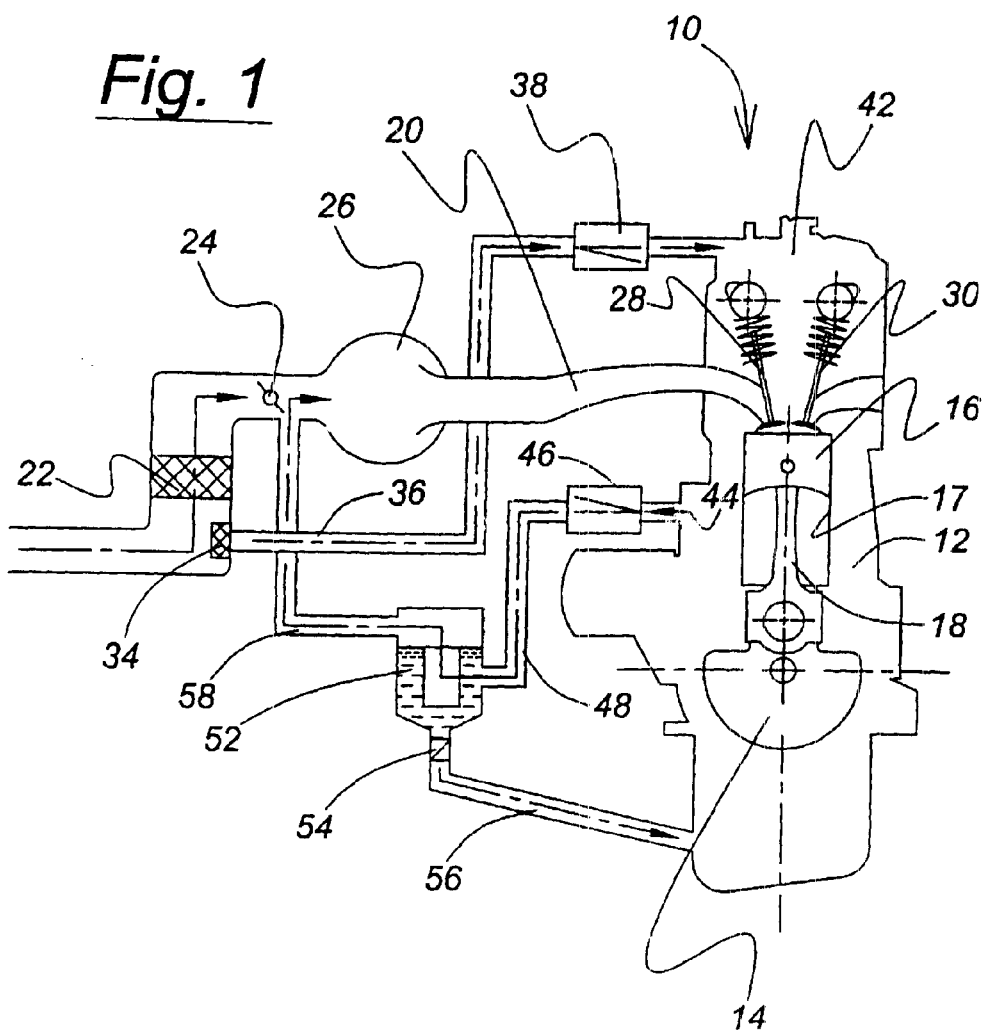
FIG. 1 is a schematic representation of an internal combustion engine having a crankcase ventilation system according to the present invention.

As shown in FIG. 1, engine 10 having crankcase 12 mounts crankshaft 14 and piston 16, which is connected to crankshaft 14 by means of connecting rod 18. Air enters into engine cylinder 17 by means of intake runner 20 and intake valve 28.

Conversely, spent exhaust gases leave past exhaust valve 30. Positive crankcase ventilation air flow originates at filter 34 in the engine's induction system. Air then passes through PCV line 36 and past inlet check valve 38. Thereafter, the air enters the upper end of the crankcase 42.

After flowing down through the crankcase 12, air leaves crankcase via exit port 44 and exit check valve 46. Because air may have entrained oil in it, it is conducted via outflow line 48 to separator 52, which comprises a coalescing filter. Check valve 54 is provided to control the flow of oil into drain line 56, which returns oil to crankcase 12. Once air flows through coalescing filter separator 52, it then flows through return line 58 into the induction system between throttle 24 and plenum 26. A difference shown in FIG. 2 is that return line 58 is split into return line 58A, wherein air returns between plenum 26 and throttle 24. Return line 58B, wherein the air, which is newly stripped of oil, flows into venturi 32. Air entering the engine, of course, passes through venturi 32, which has a low hydrogen pressure region at its throat so as to provide a motivating force for drawing air through return line 58B.

Those skilled in the art will appreciate in view of this disclosure that inlet check valve 38 and outlet or exit check valve 46 may comprise either reed valves or other types of springloaded or non-springloaded valves known to those skilled in the art and suggested by this disclosure. Similarly, the type of coalescing filter 52 or separator 52 employed with a system of the present invention may be selected by those skilled in the art in building a system according to the present invention.

While the best mode for carrying out the invention has been described in detail, those familiar with the art to which this invention relates will recognize various alternative designs and embodiments for practicing the invention as defined by the following claims. For example, the threshold value of block 44 of FIG. 2 may be set at any suitable temperature either above or below freezing.

What is claimed is:

1. A crankcase ventilation system for an internal combustion engine, comprising:

a first valve for controlling airflow into the engine's crankcase, with said airflow originating within an induction system associated with the engine;

a second valve for controlling airflow from the crankcase, with said outflow originating from a different portion of the engine's crankcase than the portion through which air enters through said first valve;

a separator for receiving air flowing from the second valve and for removing oil entrained in said air; and a return line for conducting air from said separator to said induction system, wherein said airflow through said first valve originates upstream of a flow restriction in said induction system, and said return line conducts air from said separator to a first portion of said induction system which is downstream from said flow restriction, as well as to a second portion of said induction system which is upstream from said flow restriction, with said second portion of said induction system comprising a venturi through which air being inducted into the engine flows.

2. A crankcase ventilation system according to claim 1, wherein said flow restriction comprises a throttle.

3. A crankcase ventilation system according to claim 1, wherein said first and second valves are spring operated.

4. A crankcase ventilation system according to claim 1, wherein said first and second valves comprise reed valves.

5. A crankcase ventilation system according to claim 1, wherein said separator comprises a coalescing filter.

* * * * *